United States Patent [19]

Bellati et al.

[11] 3,799,482

[45] Mar. 26, 1974

[54] STABILIZED SUPPORT STRUCTURE FOR A TURBO-MACHINE

[75] Inventors: Hans Bellati, Wettingen; Urs Ritter, Stusslingen, both of Switzerland

[73] Assignee: Brown Boveri & Company Limited, Baden, Switzerland

[22] Filed: May 26, 1972

[21] Appl. No.: 257,174

[52] U.S. Cl. .................................. 248/19, 415/219
[51] Int. Cl. ........................ F01d 1/00, F16f 15/00
[58] Field of Search ............ 248/19, 20, 23, DIG. 1; 415/136, 219 R, 134; 85/50 R

[56] References Cited
UNITED STATES PATENTS

| 1,678,968 | 7/1928 | Allen | 248/19 X |
| 3,190,041 | 6/1965 | Kimball | 248/19 |
| 3,220,289 | 11/1965 | Farekas | 85/50 R X |
| 2,835,158 | 5/1958 | Bartlow | 85/50 R |
| 1,626,760 | 5/1927 | Schneider | 248/19 |
| 1,682,317 | 8/1928 | Allen | 248/19 |
| 3,590,263 | 6/1971 | Haug | 415/134 |
| 3,520,634 | 7/1970 | Bellati et al. | 415/219 R X |
| 2,795,443 | 6/1957 | Gratzmuller | 85/50 R X |

FOREIGN PATENTS OR APPLICATIONS

| 1,156,094 | 12/1957 | France | 85/50 R |

Primary Examiner—J. Franklin Foss
Attorney, Agent, or Firm—Pierce, Scheffler & Parker

[57] ABSTRACT

A turbo-machine of the type wherein the opposite ends of the rotor component are supported by bearing pedestals, and wherein the casing structure for the machine includes supporting feet which rest upon the bearing pedestals, is stabilized on its foundation by means of tie bolts which serve to anchor the bearing pedestals to the foundation and transmit the vertical forces acting on the bearing pedestals directly, and by the shortest route, to the foundation. The tie bolts which pass, with clearance, through corresponding aligned openings in the bearing pedestals and in an intermediate plate located between the lower face of the pedestals and foundation to permit sliding movement of the pedestal, have their lower ends anchored in the foundation, and tightening nuts are provided on the upper ends of the bolts. A pair of washers having matching spherical surfaces are applied to each tie bolt beneath the tightening nut so as to compensate for any mis-alignment of the tie bolt in the vertical direction.

2 Claims, 3 Drawing Figures

PATENTED MAR 26 1974                                    3,799,482

STABILIZED SUPPORT STRUCTURE FOR A TURBO-MACHINE

The present invention relates to an improved support arrangement to ensure the stable support of a large turbomachine, the rotor of which is supported by bearing pedestals and the casing of which rests upon the bearing pedestals by means of supporting feet, the vertical forces acting on the bearing pedestals being transferred to the machine foundation.

With the increasing power of turbo-machines now being manufactured such as steam and gas turbines, compressors and electric generators, etc., the dead weight of the casings is no longer sufficient to ensure that they are stably supported. In the case of steam turbines with power output ratings of more than 500 MW, for example, even the torque created by the fixed blading is sufficient to cause the supporting feet to lift to one side. Further to this are the reaction forces of the live-steam, exhaust-steam and bleed lines, which can be superimposed additively on the power torque and which impart additional lifting forces on the supporting feet.

The radial clearances at the blading and labyrinth seals of turbo-machines are very small, amounting to only a few tenths of a millimetre. Lifting of the supporting feet would thus cause the blading and labyrinths to touch. While damaged blading, in the case of steam and gas turbines, usually result only in a lowering of the efficiency, and in the case of compressors reduce the attainable pressure ratio, contact within the labyrinths can cause deformation of the shaft, leading to a serious breakdown.

In turbo-machines of modern design the bearing pedestals rest on a baseplate which is joined to the machine foundation. Vertical forces acting on the bearing pedestal are transmitted by way of the baseplate to the foundation, and for this reason the baseplate must be of strong construction. With turbo-machines of high capacity, the baseplates are large and expensive.

The primary object of the invention is to prevent the supporting feet from lifting off and to eliminate the associated disadvantages without, however, impairing expansion due to elevated temperature, and to transmit the forces to the foundation by the shortest possible route and with the least possible complexity of design.

This objective is achieved by means of tie bolts which pass with a clearance through the bearing pedestals and an intermediate plate and are anchored direct in the machine foundation.

To prevent the tie bolt nut from bearing unevenly if the tie bolt itself should be slightly tilted, two packing washers of known form with matching spherical contact surfaces are provided between the tie bolt nut and its bearing surface on the bearing pedestal.

In order that the tie bolt nut can still be released after a long time in service, and in the event of a high initial stress, it is advisable that one of the two packing washers should have a middle portion of annular cross-section.

The main advantage of the invention is that the vertical forces acting on the bearing pedestal are transmitted direct to the foundation, without the intervention of other structural elements. There is no baseplate in the former sense; between the bearing pedestals and the foundation there is only a comparatively thinner intermediate metallic rolled plate which is machined to serve as a sliding surface to allow free expansion of the bearing pedestals. The invention is applicable to both steel and concrete foundations. Measures are taken to ensure that the tie bolt nuts are always seated squarely on the bearing surface and can be loosened even when subjected to very great initial stress.

An example of the invention is shown in the accompanying diagrammatic drawings, and is explained in more detail below.

Figure 1:
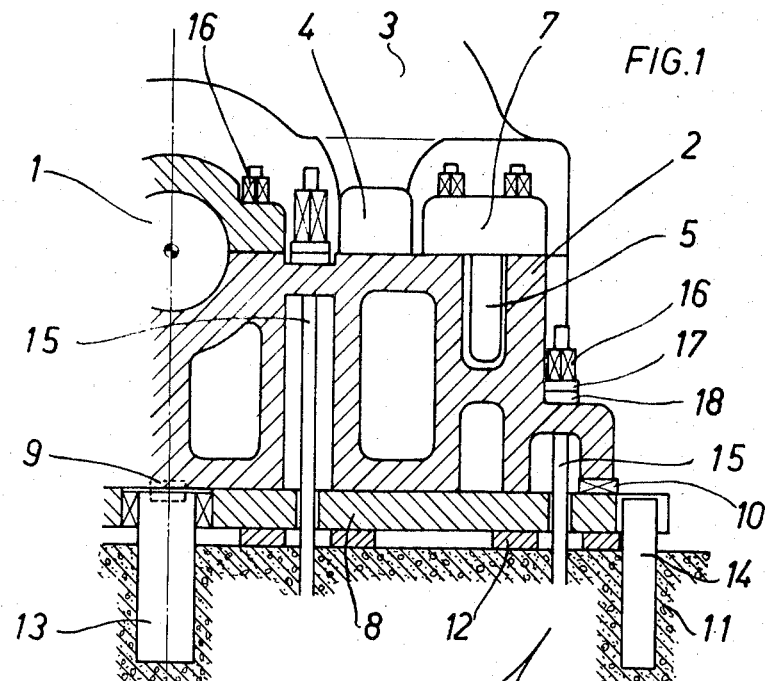
FIG. 1 is a vertical half-section through a bearing pedestal of a turbo-machine resting upon a concrete foundation.
Figure 2:
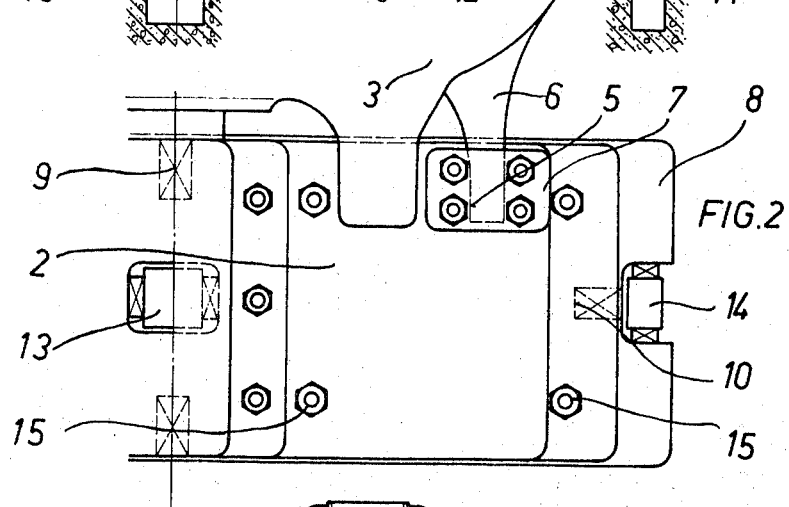
FIG. 2 is a plan view of the bearing pedestal of FIG. 1.

With reference now to FIGS. 1 and 2, the bladed rotor shaft 1 of a turbo-machine, e.g. a steam turbine, is supported by bearing pedestals 2 on which the upper portion 3 of the machine casing rests by way of supporting feet 4. The supporting feet 5 of the lower portion 6 of the casing which is joined to the upper portion 3 by a flange (not shown), project into bearing pedestal 2 and are held by cover 7. The bearing pedestal rests on intermediate plate 8, which serves as a sliding surface. Keys 9 and 10 are provided between the bearing pedestal 2 and the intermediate plate 8 to allow guided expansion of the bearing pedestal.

Intermediate plate 8 does not rest directly on the concrete foundation 11, but rather upon spacers 12 which are used for levelling the intermediate plate. Forces and moments acting on the intermediate plate in the horizontal plane are transferred to keys 13 and 14 cast into the concrete foundation.

In accordance with the invention, a plurality of tie bolts 15 distributed over the area of the bearing pedestals function to hold down these pedestals on the foundation. Prior to installation of the turbo-machine on its foundation, the lower ends of the vertically extending tie bolts are cast or otherwise secured into the foundation to provide a firm anchor for the bolts, and the shank portions of the bolts pass, with clearance, through correspondingly aligned openings provided in the intermediate plate 8 and in the bearing pedestals themselves. The upper ends of the bolts 15 which terminate above the upper surface of the pedestal are threaded to receive the bolt-tightening nuts 16, and washers 17, 18 are interposed between the nuts and surface of the pedestal. In this manner, the vertical forces acting upon each bearing pedestal, there being a pedestal located at each end of the shaft 1, are transmitted directly, and by the shortest route, to foundation 11.

Figure 3:
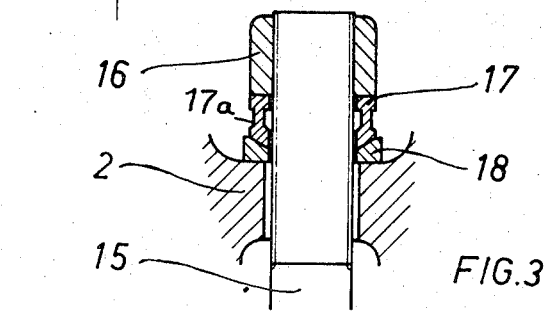
FIG. 3 is a detail of one of the tie bolts.

As can be seen from FIG. 3, the two packing washers 17 and 18 for each tie bolt and tightening nut are of spherical shape at their contact surfaces, washer 17 being convex and washer 18 concave, and both having the same radius of curvature so that they fit into each other exactly. This configuration ensures that the nut and washers, when fitted, seat squarely on the surface of the bearing pedestal even when the tie bolt is slightly out of true, as could result from casting or due to slight deformation.

Packing washer 17 has a middle portion 17a of annular cross-section. This is of benefit when, on the occasion of an adjustment after a long time in service, one or more of the tie-bolt nuts 16 cannot be unscrewed owing to the tension applied to the bolts. The annular middle portion 17a of the washer is so dimensioned that by heating with a welding torch it can be caused to collapse in the axial direction under the initial tension on the bolt. This avoids forceful removal of the castin tie bolt and subsequent, expensive recasting of the bolt into a concrete foundation, although the device is also of benefit with a steel foundation. It is self-evident that packing washer 18 may also be provided with a middle portion of annular cross-section if desired for the same purpose.

As an alternative construction, the nuts for the tie bolts 15 may be embedded in the foundation and the tie bolts threaded into them in which case the dual washers 17 and 18 would be located between the face of the pedestal 2 and the head of the tie bolt.

We claim:

1. A stabilized support structure for turbo-machines wherein the opposite ends of the rotor component of the machine are supported by bearing pedestals and the casing structure for the machine includes supporting feet which rest upon the bearing pedestals, the improvement wherein a plurality of vertically extending tie bolts distributed over the area of the bearing pedestals are utilized to anchor the bearing pedestals to the foundation provided for the machine and transmit the vertical forces acting on the bearing pedestals directly, and by the shortest route, to the foundation, the lower ends of said tie bolts being anchored in the foundation and the shank portions thereof passing upwardly with clearance through correspondingly aligned openings provided in the bearing pedestals and in a plate permitting slidable contact with the bottom faces of said bearing pedestals.

2. A stabilized support structure for turbo-machines as defined in claim 1 wherein the lower ends of said tie bolts are embedded in the foundation, the upper ends of said tie bolts above the upper faces of said bearing pedestals being threaded and receiving tightening nuts to tensionally stress the bolts.

* * * * *